United States Patent [19]
Milone

[11] Patent Number: 4,999,008
[45] Date of Patent: Mar. 12, 1991

[54] FLEXIBLE BAR FOR SPECTACLES AND MANUFACTURING METHOD

[75] Inventor: Carmine Milone, Venegono Inferiore, Italy

[73] Assignee: Mirage S.r.l., Venegono Inferiore, Italy

[21] Appl. No.: 435,833

[22] Filed: Nov. 14, 1989

[30] Foreign Application Priority Data

Nov. 18, 1988 [IT] Italy ................... 22667A/88

[51] Int. Cl.⁵ .................... G02C 5/16; G02C 5/14
[52] U.S. Cl. ........................... 351/113; 351/121; 425/595
[58] Field of Search ............... 351/113, 121, 114, 119, 351/126; 425/542, 543, 544, 595; 2/448, 449, 450; 264/328.1, 328.7, 328.9

[56] References Cited

U.S. PATENT DOCUMENTS 4,377,328  3/1983  Ferrandi .................. 351/113 X

*Primary Examiner*—Rodney B. Bovernick
*Attorney, Agent, or Firm*—Young & Thompson

[57] ABSTRACT

The present invention concerns a bar for spectacles formed in two parts of relatively stiff plastic material, joined together by means of an elastic springing element in the form of a spiral spring. According to the invention, said elastic element also comprises a flat spring with surface positioned on a vertical plane, said spiral spring being wound in tight coils around a central part of said flat spring and being checked on opposite sides by two stop rings, the end parts of said flat spring forming means of anchorage into the two bar portions of plastic material.

The invention also concerns a method for manufacturing said bars for spectacles, wherein said end parts of the flat spring of the elastic element are enclosed into a respective box of an injection mold, using said stop rings of the elastic element to delimit and close the mold, plastic material being then injected into said boxes to incorporate said end parts of the flat spring.

8 Claims, 2 Drawing Sheets

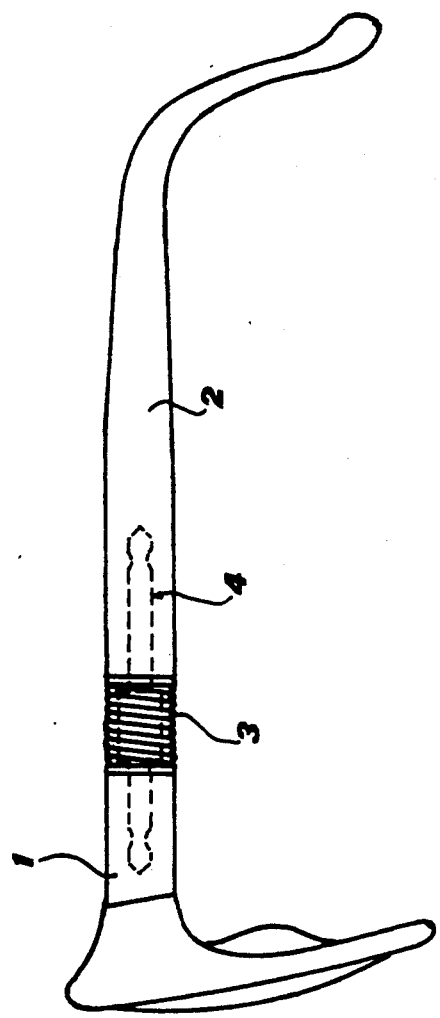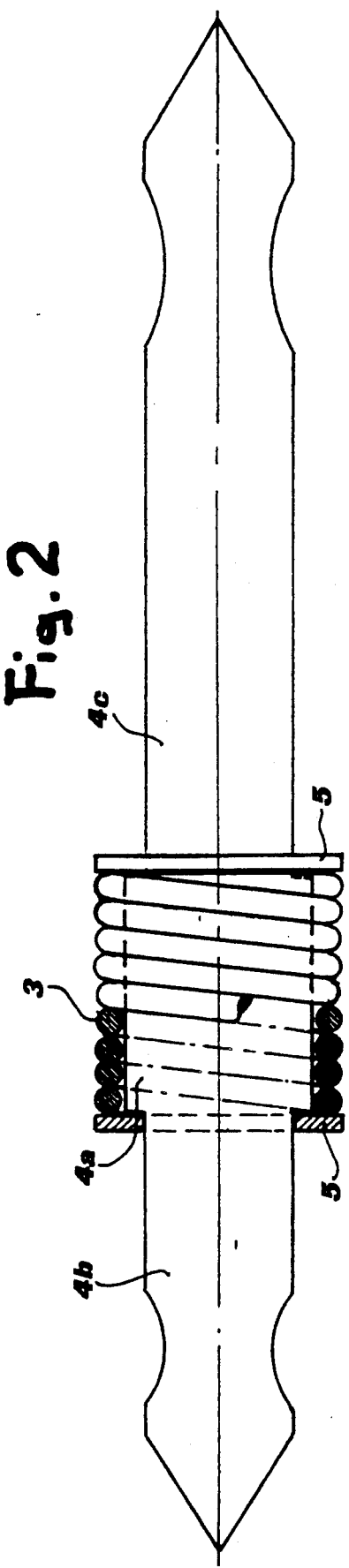

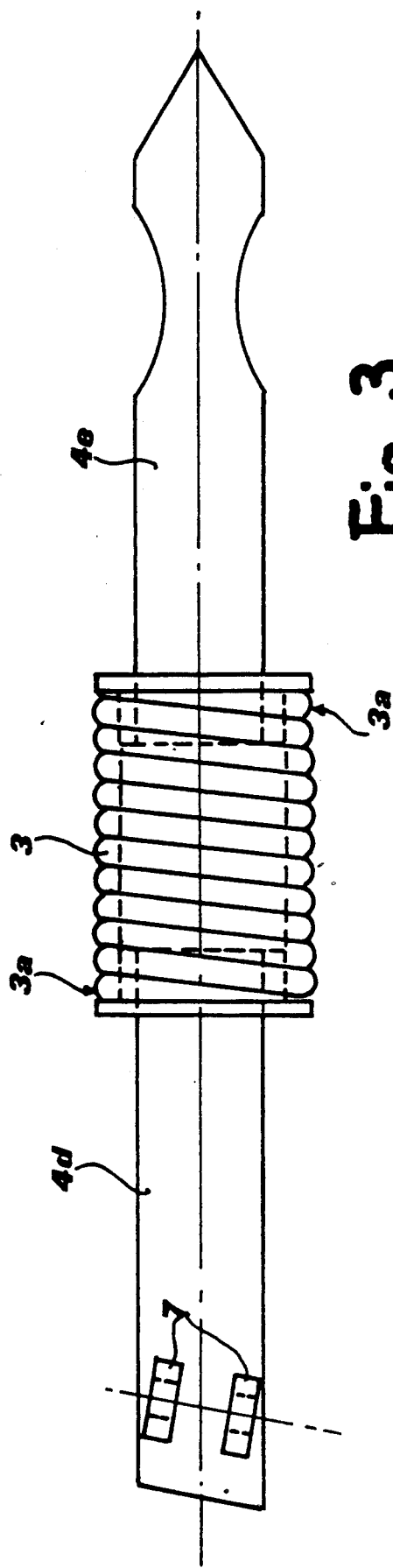
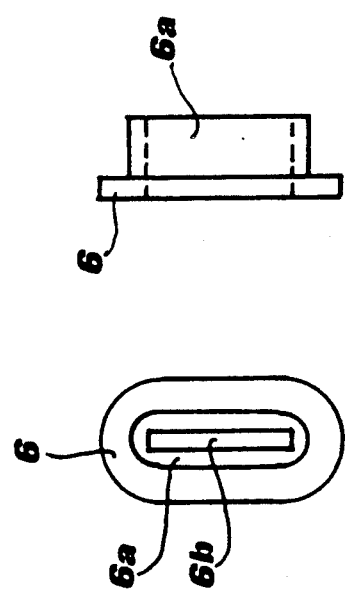

FLEXIBLE BAR FOR SPECTACLES AND MANUFACTURING METHOD

BACKGROUND OF THE INVENTION

The object of the present invention is an improved flexible bar structure for spectacles. It is known that spectacles bars should be flexible enough to be elastically opened wide apart, to an extent sufficient to allow the spectacles to be easily put on, while—on the other hand—they should be stiff enough to produce a correct contact pressure on the temples.

This flexibility of the bars is at present obtained with different techniques. Amongst them, the simplest, most diffused and most economic one is no doubt that of producing the bars of a plastic material having elasticity properties of its own, suited for the purpose.

Nevertheless, the drawback of this technique is that the characteristics of flexibility of the bars are inadequate. In fact, if the plastic material from which they are made is very flexible, it will no doubt be easy to put on the spectacles, in that the bars can be opened wide apart, but the contact pressure of the bars on the temples is too weak to guarantee a proper grip of the spectacles in a position of use. If, viceversa, the plastic material is quite stiff, it will be more difficult to put on the spectacles and, on the other hand, the pressure of the bars on the temples may prove uncomfortable after the spectacles have been worn for some time.

Another technique is that normally used for spectacles frames made entirely of metal. In this case, the bars are formed as relatively stiff metal stems, anchored to the front part of the frame by means of so-called elastic hinges. An elastic hinge is preferably configured so as to have a dead center position—or position of stable equilibrium—in which it is returned by suitably calibrated spring means. The combination of these two elements—namely, the spring-loaded hinge and the relatively stiff metal bars—allows both to easily put on the spectacles, in that the elastic hinges allow to open the bars wide apart, and to comfortably wear them, in that the stiff bars, under the return action of the springs of the hinges, produce a correct contact pressure on the temples. Nevertheless this technique is, as already said, on one hand almost exclusively limited to entirely metallic frames, and this for manufacturing purposes, and on the other hand it is fairly expensive for the use of the above-mentioned type of hinge.

To improve the characteristics of flexibility of plastic bars, it has been proposed to insert into the body of the bar a flexible core in the form of a thin metal lamina. The improvement thereby obtained essentially derives from the fact that a bar thus made can undergo, with heat, a permanent deformation, so as to be adapted in a more precise manner to the shape of the head of the person wearing the spectacles; nevertheless, its characteristics of flexibility are not substantially improved.

A further proposal is provided by the FR-A-1.238.393 or by the EP-A1-0.061.555, and it consists in forming the bar in two parts and connecting them by means of a cylindrical spiral spring. Also this solution has not been found satisfactory because said spiral spring, on one hand, provides a flexibility in every direction (see FIGS. 1 and 2 of FR-A-1.238.393)—which constitutes a drawback as far as wearability and comfort of the spectacles—and, on the other hand, it tends to loose efficiency and slacken with time. The drawbacks of these known types of spectacles bars have been pointed out in the FR-A-2.588.389, which proposes—in order to overcome the same—a bar structure comprising a metal stiffening core onto which a spiral spring is fitted. According to what is expressly stated in this patent, the stiffening core is apt to be deformed so as to be adapted to the person wearing the spectacles, while the elasticity is guaranteed by the spiral spring. In reality, experience has proved that in this bar structure the stiffening core, in order to be able to preserve the desired shape, obtained by non-elastic deformation, has a rigidity such that the spiral spring fitted thereon is no longer apt to guarantee any elastic action.

Furthermore, according to the manufacturing method of this patent, the stiffening core is fixed to the bar portion carrying the hinge and, onto the same, there is first fitted the spiral spring and subsequently the second part of the plastic bar. This first of all involves considerable manufacturing difficulties when having to fit the second plastic part of the bar, which operation has to be carried out manually, and furthermore, it also involves problems as far as a steady fixing of said second part: experience teaches that, in a bar thus formed, the second plastic part can easily fall apart by slipping out during use. A further drawback the lies in the fact that—as in the case of FR-A-1.238.393—this structure provides a flexibility in every direction; and this is all the more serious in that the spring is allowed to rotate over the core, since nothing checks it, and can thus damage the ends of the plastic parts.

Substantially the same drawbacks occur with a bar structure as that described in the DE-C-684.189, which is besides relatively complex and difficult to manufacture, especially due to the presence of a tubular core.

SUMMARY OF THE INVENTION

The object of the present invention is to obtain a bar structure for spectacles providing excellent characteristics of flexibility—in particular, apt to be opened wide apart, so as to easily put on the spectacles, and to produce a correct contact pressure of the bars onto the temples—but being at the same time easy to manufacture and of relatively low cost.

Another object of the invention is to propose a bar structure which can be mass produced with an automatic molding machine.

A still further object of the invention is to propose a manufacturing method for spectacles bars, allowing mass production with the injection molding technique.

These and other objects are reached first of all due to the fact that the bar is formed in two parts of relatively stiff plastic material, joined together by means of an elastic springing element in the form of a spiral spring, and is characterized in that said elastic element also comprises a flat spring with surface positioned on a vertical plane, in that said spiral spring is wound in tight coils around a central part of said flat spring and is checked on opposite sides by two stop rings, and in that the end parts of said flat spring form means of anchorage into the two bar portions of plastic material.

Thus, differently from known technique, the elastic element joining the two plastic parts of the bar is formed by the combination of two members and, precisely, the spiral spring and the flat spring. These two members form moreover a unit which can be easily prefabricated and then mounted directly in an injection mold.

According to another aspect of the invention, said elastic element can be very efficiently utilized in a manufacturing method which is essentially characterized in that, said end parts of the flat spring of the elastic element are enclosed into a respective box of an injection mold, using said stop rings of the elastic element to delimit and close the mold, plastic material being then injected into said boxes to incorporate said end parts of the flat spring.

BRIEF DESCRIPTION OF THE DRAWINGS

Further characteristics and advantages of the spectacles bar according to the present invention will anyhow be more evident from the following description of some preferred embodiments thereof, given by mere way of example and illustrated on the accompanying drawings, in which:

FIG. 1 is a side view of a pair of spectacles provided with a bar according to the invention;

FIG. 2 is a side part section view of the spiral spring and of the flat spring forming the elastic element of the bar according to the invention;

FIG. 3 is a view similar to that of FIG. 2, showing a modified embodiment of the bar; and FIGS. 4 and 5 are, respectively, a front view and a side view of a stop ring used in the bar according to the invention.

DESCRIPTION OF THE PREFERRED EMBODIMENTS

As clearly shown in FIG. 1, the spectacles bar according to the invention is formed of two bar portions 1 and 2, joined together through an elastic element.

According to the embodiment shown in FIG. 2, said elastic element consists of a unit formed of a spiral spring 3 and of a flat spring 4, both of metal. The spring 3 is helically wound only around the central part 4a of the flat spring 4, said central part being joined to the end parts 4b and 4c—which are narrower—by way of toothed shoulders. The surface of the flat spring 4 is positioned vertically into the bar mounted on the spectacles, so that the bar is flexible only horizontal-wise, as required, and as necessary for correctly wearing the spectacles.

Against the toothed shoulders of the flat spring 4 bear two respective stop rings 5 having a central opening formed as a slit, of size corresponding to the cross section of the end parts 4b, 4c of the flat spring 4, so as to force said parts into the respective slits. The spiral spring 3 is contained and checked between the rings 5.

The embodiment of FIGS. 3 to 5 provides for stop rings 6 having an axial extension 6a fixed, by forcing, into the first coil 3a of the spring 3. The end portion 4d or 4e of the flat spring is in turn fixed, by forcing, into the slit 6b of the ring 6. The fixing both of the spring 3 and of the flat spring portions 4d and 4e on the ring 6 can eventually also be secured by means of a welding point.

The unit formed by the springs 3 and 4 is connected to the bar portions 1 and 2 by known techniques, for example: —hot inserting the end parts 4b and 4c into the two bar portions 1 and 2 respectively, up to carrying the stop rings 5 against the ends of said two bar portions; —but, preferably, forming the bar portions 1 and 2 by injection molding of plastic material, and incorporating directly the ends parts 4b and 4c of the flat spring 4 into the molded material.

The elastic element according to the invention provides for this purpose an additional advantage, it being possible to introduce the unit formed by the springs 3 and 4 directly into the mold for molding the two bar portions, utilizing the stop rings 5 or 6 as parts for closing the mold, and molding simultaneously said portions 1 and 2.

This allows to form the two plastic parts of the bar with a single molding operation, preventing on the other hand the injected plastic material from penetrating between the coils of the spring 3 or between this latter and the flat spring 4, which would cause an undesired blocking of these parts. The ends of said portions 4b and 4c of the flat spring 4 preferably have a shape as that illustrated in FIGS. 2 and 3, which is apt to provide a reliable grip into the plastic material of the bar portions.

It is thus possible to obtain a spectacles bar formed of two parts 1, 2, each in corporating a respective portion of the flat spring 4 and reciprocally joined by said spring and by the spiral spring 3.

Since the two bar portions 1 and 2 are formed of relatively stiff material, the flexibility of the bar is essentially determined by the unit formed by the springs 3 and 4. The degree of flexibility can thus be perfectly calibrated by appropriate choice of the thickness and quality of the steel forming the springs 3 and 4, which is the essential advantage provided by the invention.

In the embodiment of FIG. 3 it can also be seen how the end of the flat spring part 4d on the side of the bar portion 1, can be formed as a hinge element 7 apt to cooperate directly with a corresponding hinge element (not shown) fixed on the front frame of the spectacles. This also improves the strength of the hinge.

It is anyhow understood that the invention is not limited to the above described and illustrated embodiments, but that different constructive variants are possible, within reach of an expert in the art, all falling within the protection scope of the invention itself.

I claim:

1. Flexible bar for spectacles, formed in two parts of relatively stiff plastic material, joined together by means of an elastic springing element in the form of a spiral spring, characterized in that said elastic element also comprises a flat spring with surface positioned on a vertical plane, in that said spiral spring is wound in tight coils around a central part of said flat spring and is checked on opposite sides by two stop rings, and in that the end parts of said flat spring form means of anchorage into the two bar portions of plastic material.

2. Flexible bar for spectacles as in claim (1), wherein the central part of said flat spring extends into said two end parts thereof by way of toothed shoulders, against which bear said stop rings.

3. Flexible bar for spectacles as in claim (1), wherein said stop rings each have a central opening formed as a slit, into which are inserted, by forcing, said end parts of the flat spring.

4. Flexible bar for spectacles as in claim (3), wherein said stop rings each have an axial extension fixed into the first coil of the spiral spring.

5. Flexible bar for spectacles as in claim (1), wherein one of said end parts of the flat spring carries, fixed to its end opposite to the spiral spring, a hinge element.

6. Flexible bar for spectacles as in claim (3), wherein said two plastic parts of the bar are formed by injection molding, the end parts of the flat spring being configured so as to grip into the plastic material, and said stop rings delimiting and closing the injection mold.

7. Method for manufacturing spectacles bars formed of two end parts of plastic material anchored onto a central part in the form of an elastic element in the form of a spiral spring, said elastic element also comprising a flat spring with surface positioned on a vertical plane, said spiral spring being wound in tight coils around a central part of said flat spring and being checked on opposite sides by two stop rings, the end parts of said flat spring forming means of anchorage into the two bar portions of plastic material, characterized in that, said end parts of the flat spring of the elastic element are enclosed into a respective box of an injection mold, using said stop rings of the elastic element to delimit and close the mold, plastic material being then injected into said boxes to incorporate said end parts of the flat spring.

8. A flexible bar for spectacles formed by the method of claim 7.

* * * * *